United States Patent
Moore et al.

(10) Patent No.: US 9,632,208 B2
(45) Date of Patent: Apr. 25, 2017

(54) ROTATIONAL GRAVITY GRADIOMETER

(71) Applicants: Russell David Moore, State College, PA (US); Nicholas John Braskey, Pottstown, PA (US)

(72) Inventors: Russell David Moore, State College, PA (US); Nicholas John Braskey, Pottstown, PA (US)

(*) Notice: Subject to any disclaimer, the term of this patent is extended or adjusted under 35 U.S.C. 154(b) by 136 days.

(21) Appl. No.: 14/758,702

(22) PCT Filed: Nov. 7, 2013

(86) PCT No.: PCT/US2013/068898
§ 371 (c)(1),
(2) Date: Jun. 30, 2015

(87) PCT Pub. No.: WO2015/069254
PCT Pub. Date: May 14, 2015

(65) Prior Publication Data
US 2016/0216401 A1    Jul. 28, 2016

(51) Int. Cl.
| | |
|---|---|
| *G01V 7/08* | (2006.01) |
| *G01V 7/16* | (2006.01) |
| *G01V 7/00* | (2006.01) |
| *G01V 7/10* | (2006.01) |
| *G01V 7/06* | (2006.01) |

(52) U.S. Cl.
CPC ............ *G01V 7/00* (2013.01); *G01V 7/06* (2013.01); *G01V 7/10* (2013.01)

(58) Field of Classification Search
CPC ........... G01V 7/0002; G01V 7/08; G01V 7/16
USPC ................................. 73/382 G, 382 R, 383
See application file for complete search history.

(56) References Cited

U.S. PATENT DOCUMENTS

| | | |
|---|---|---|
| 3,273,397 A | 9/1966 | Forward |
| 3,564,921 A * | 2/1971 | Bell .................. G01V 7/10 73/382 R |
| 3,567,155 A | 3/1971 | Gatlin et al. |
| 3,722,284 A | 3/1973 | Weber et al. |
| 7,360,419 B2 | 4/2008 | French et al. |

(Continued)

OTHER PUBLICATIONS

C. Jekeli, "100 Years of Gravity Gradiometry", Geological Science, 781, Gravimetry, Nov. 27, 2007, 38 pgs.

*Primary Examiner* — David Gray
*Assistant Examiner* — Andrew V Do
(74) *Attorney, Agent, or Firm* — Spilman, Thomas & Battle PLLC; William P. Smith

(57) ABSTRACT

A rotational gravity gradiometer includes a first member, a second member, a drive member and a motor. The first member is disposed above the second member orthogonal to and centered with respect to the second member. The first member includes support arms extending from the center of the first member. The second member includes a second pair of support arms extending from a center point of the second member. A mass unit is attached at a distal end of the respective first member and second member. A sensor element is attached between each mass unit a connection point of the opposite member for sensing movement of the mass unit. The drive member is coupled to the motor to drive the first member and the second member rotationally. The respective sensor elements generate a signal in response to deflection of the support arm induced by an external mass.

19 Claims, 5 Drawing Sheets

(56) References Cited

U.S. PATENT DOCUMENTS 7,823,449 B2 11/2010 Van Kann et al.
8,069,725 B2 12/2011 Moody
8,201,448 B2 6/2012 French et al.

* cited by examiner

ROTATIONAL GRAVITY GRADIOMETER

BACKGROUND

The application generally relates to a rotational gravitational gradiometer. The application relates more specifically to a quadrupole responder for an Orthogonal Quadrupole Responder (OQR)-type gravity gradiometer.

A gravity gradiometer measures a gravitational field. Gravity gradiometers can be used, e.g., for controlling and stabilizing the attitude of an artificial earth satellite. The gravity gradiometer may include a gravity gradient member mounted in a gimbal arrangement to have two degrees of freedom. In other gravity gradiometers a flexural pivot and torsion spring may be required.

A gravity gradiometer may measure the Riemann curvature of spacetime produced by nearby masses. By flying a gradiometer in an airplane above the Earth's surface, one can measure subsurface mass variations due to varying geological structure. In an Earth-orbiting satellite, such a gradiometer could measure the gravitational multi-pole moments of the Earth.

SUMMARY

One embodiment relates to a rotational gravity gradiometer including a first member, a second member, a drive member and a motor. The first member is disposed above the second member orthogonal to and centered with respect to the second member. The first member includes a first pair of support arms extending axially from a center of the first member. The second member includes a second pair of support arms extending axially from a center point of the second member. A mass unit is attached to opposite ends of each support arm at a distal end of the respective first member and second member. A sensor element is attached between each mass unit of the first member and a connection point of the second member for sensing movement of the respective mass unit. A sensor element is attached between each mass unit of the second member and the drive member. The drive member is coupled to the motor to drive the first member and the second member rotationally. The respective sensor elements generate a signal in response to deflection of the support arm induced by an external mass.

Another embodiment relates to a rotational gravity gradiometer including a first orthogonal member, a second orthogonal member, and a drive member. Sensor elements for sensing vibration extending from an end mass unit at an end of each orthogonal member. The sensor elements are attached to the second member or drive member beneath the first and second orthogonal members, respectively, to provide a mass spring dampener having a single degree of freedom between each member. The sensor elements generate a signal in response to a deflection of the orthogonal member induced by an external mass.

Yet another embodiment relates to a method for detecting gradients in a gravitational field, including providing a first orthogonal member, a second orthogonal member, and a drive member for rotating the orthogonal members; fixing the first orthogonal member and the second orthogonal member on a common center and having a respective axis orthogonal to each other; rotating the first orthogonal member and the second orthogonal members by the drive member; providing a sensing element connected to opposite ends of each of the first orthogonal member and the second orthogonal and isolating the sensing material from external noise; sensing a movement of one of the first and second orthogonal members relative to one another; generating a signal in response to the sensed relative movement; and determining a gravity gradient in response to the sensed relative movement.

Certain advantages of the embodiments described herein include the ability to detect gradients or variations in the Earth's gravitational field.

Another advantage is the use of an orthogonal gravitational gradiometer as disclosed herein to identify subsurface features such as oil and gas deposits or mineral deposits, etc.

Further advantages include the use of the gradiometer for sensing volcanic activity, natural resource prospecting, space-craft attitude control, ground-based GPS corrections at base stations, airborne/marine gravity surveys, locating meteorites, tracking the melting of ice caps, and similar applications.

Alternative exemplary embodiments relate to other features and combinations of features as may be generally recited in the claims.

DETAILED DESCRIPTION OF THE EXEMPLARY EMBODIMENTS

Figure 4:
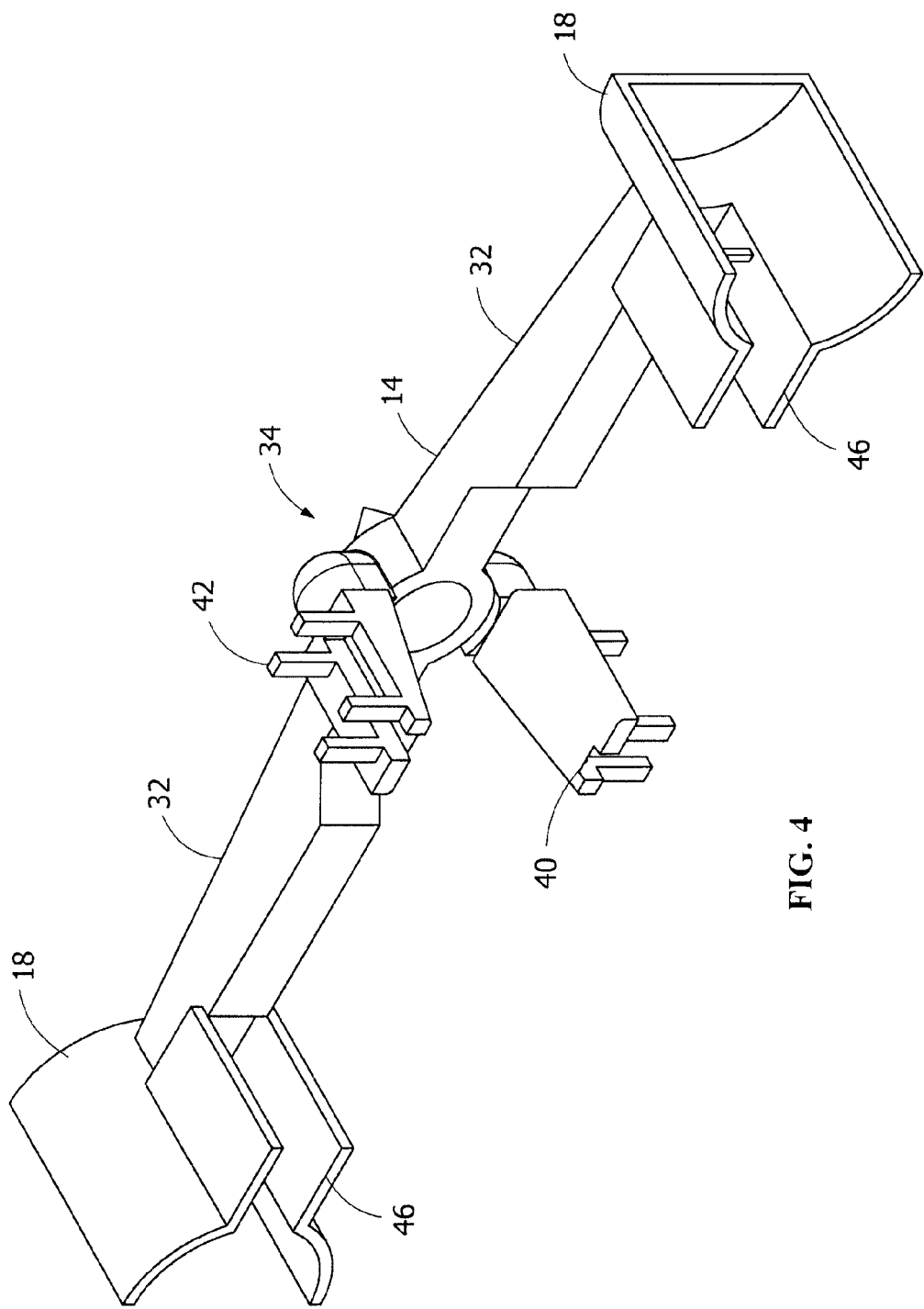
FIG. 4 is a perspective view of a second orthogonal member comprising a middle tier of the gravity gradiometer of FIG. 1.

Referring to FIGS. 1-5 a gravity gradiometer 10 consists of a first orthogonal member 12 (FIG. 3) and a second orthogonal member 14 (FIG. 4). First orthogonal member 12 is positioned above second orthogonal member 14 with the axes of orthogonal members 12, 14 generally perpendicular with one another. Each orthogonal member 12, 14 is arranged with a pair of mass units 16 mounted to mass holder 18 attached to opposite ends of the respective orthogonal member 12, 14. Orthogonal member 12 is formed by a pair of support arms 20 attached to a hub portion 22 having a recess 24 for receiving a centering projection 26 of adjacent orthogonal member 14. Hub portion 22 connects support arms 20 in a linear axial relation and provides an axial contact point with orthogonal member 14 on an axis perpendicular to orthogonal members 12, 14.

Figure 1:
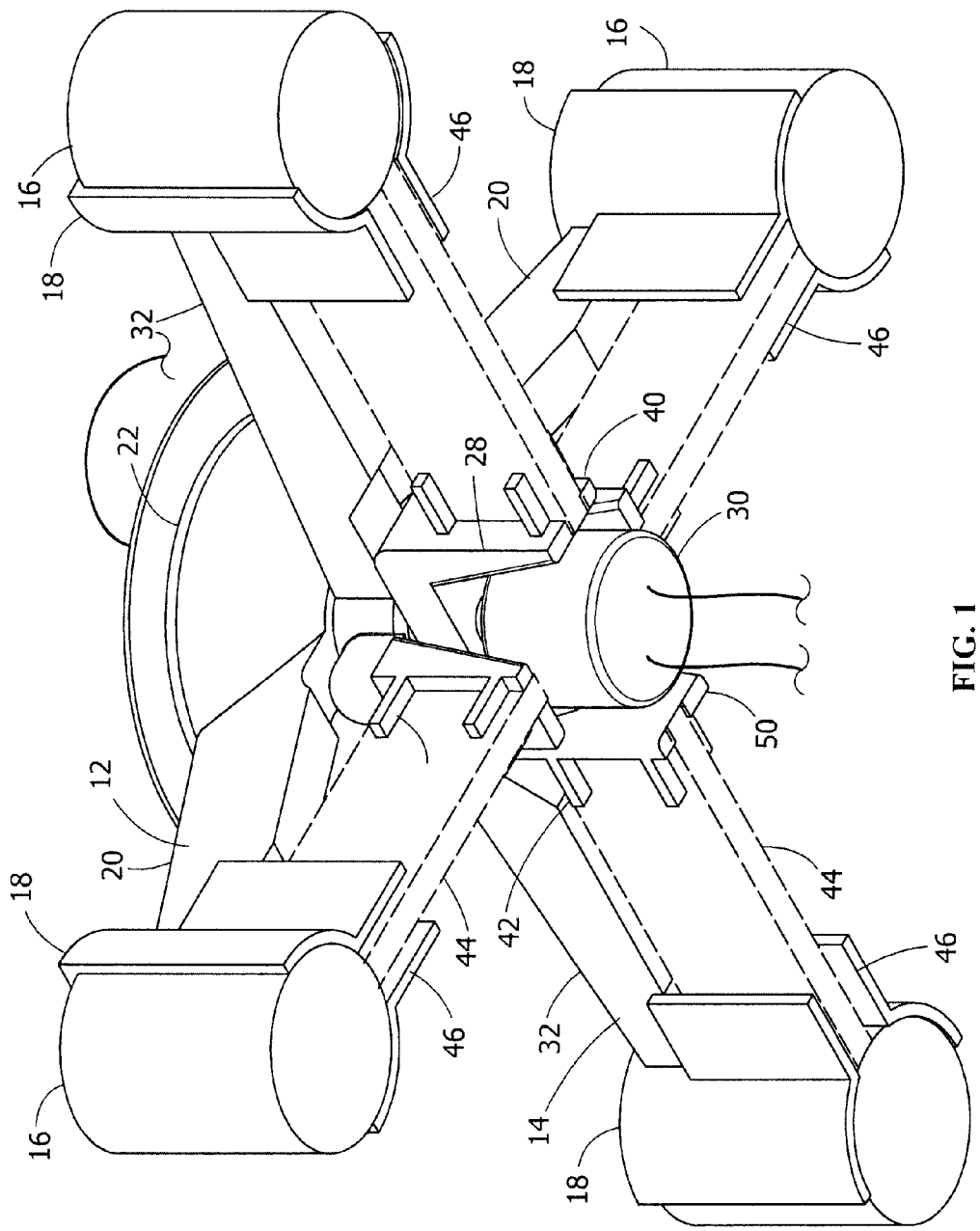
FIG. 1 is a perspective view of an exemplary gravity gradiometer.
Figure 2:
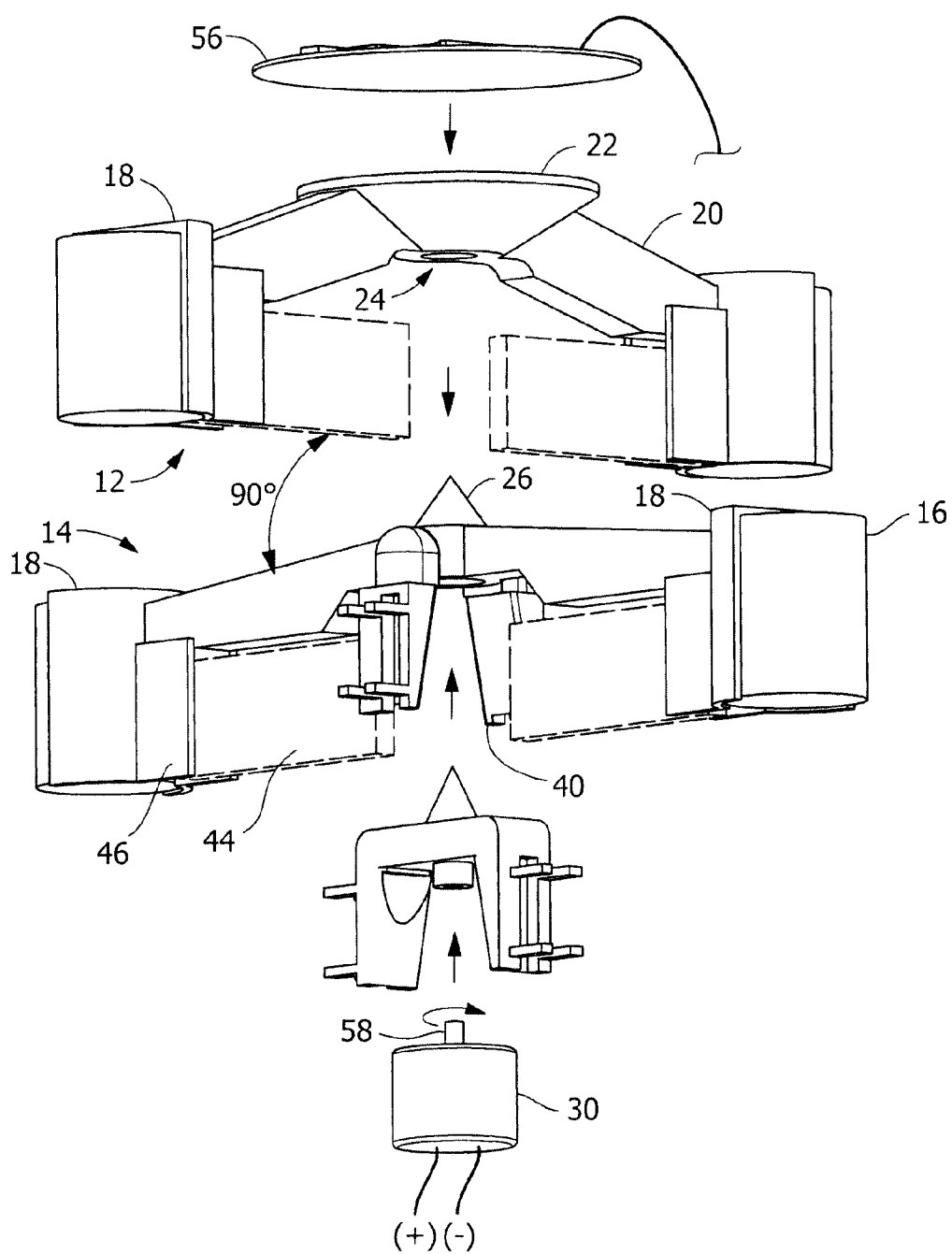
FIG. 2 is an exploded view of the gravity gradiometer showing the arrangement of orthogonal members and drive arrangement.
Figure 3:
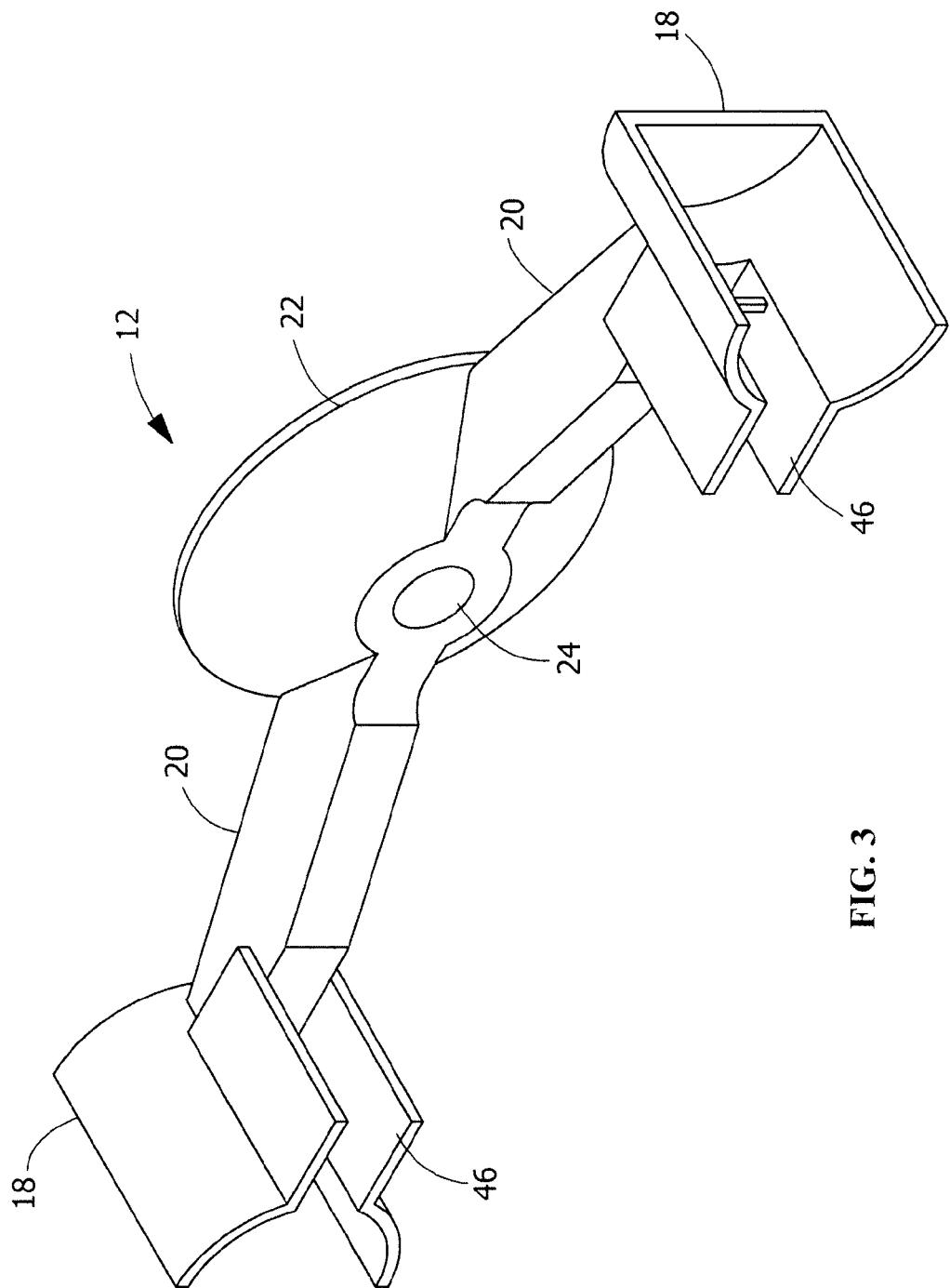
FIG. 3 is a perspective view of a first orthogonal member comprising a top tier of the gravity gradiometer of FIG. 1.

As shown in FIG. 4, second orthogonal member 14 is arranged below first orthogonal member 12 and above a drive member 28 (FIG. 5) that supports a motor 30. Orthogonal member 14 is formed by a pair of support arms 32 attached to a center connection 34 having a recess 36 for receiving a centering projection 38 of adjacent drive member 28. Recess 36 is positioned opposite center projection 26 and is axially aligned with center projection 26 and centering projection 38. Orthogonal member 14 includes a pair of opposing bracket portions 40 affixed to center connection 34. Bracket portion 40 includes four mounting fingers 42 for attachment of a sensor element 44 (FIGS. 1 and 2). In one embodiment sensor element 44 is a piezo vibration sensor. The piezo vibration sensor may be, e.g., a cantilever-type vibration sensor, which is loaded by mass units 16 with high sensitivity at low frequencies. Sensor element 44 detects vibration caused by deflection of support arms 20, 32. A signal, e.g., a small AC voltage, is generated when the sensor element 44 moves horizontally back and forth. External electronic equipment may be used to increase or reduce the amplitude of the signal and/or filter noise produced by the sensor in order to condition the signal for processing. Sensor elements 44 have electrical connection pins at one end to bracket portions 40 for connecting the wire to sensor element 44 for transmitting an output signal to, e.g., a printed circuit board. At the opposite end sensor element 44 is attached to a connector portion 46 of mass holder 18.

When support arms 20, 32 are twisted out of orthogonal alignment, an oscillation is induced in mass units 16 and support arms 20, 32 in a horizontal plane. Sensor elements 44 generate an output signal that measures the oscillation amplitude. When placed near an external mass, M, the gradiometer experiences a torque. The torque is generated by the external mass because of a gradient in the gravitational field of M (i.e., because of the spacetime curvature produced by M). The Newtonian forces acting on the two nearest mass units 16 ($m_1$ and $m_2$) to M are greater than the Newtonian forces acting on the more remote mass units 16, such that a net torque pulls the two nearest mass units 16 toward each other, and the remote pair of mass units toward each other. When in operation gravity gradiometer 10 rotates with an angular velocity about its center, the angular velocity generated by the rotation of motor 30. As gravity gradiometer rotates the torques on arm supports 20, 32 oscillate as follows:

at $\omega t=0$ net torque pushes ($m_1$ and $m_2$) toward each other;
at $\omega t=\pi/4$ net torque is zero;
at $\omega t=\pi/2$ net torque pushes ($m_1$ and $m_2$) away from each other.

The angular frequency of the oscillating torque is $2\omega$. If $2\omega$ is set equal to the natural oscillation frequency of the arms, the oscillating torque drives the arms into resonant oscillation.

Sensor elements 44 may be made from the piezo laminate of piezo vibration sensors with a laterally bending material for sensor element 44. By making the laterally bending material of piezo laminate a sensing element, noise is reduced in the output signal. Sensing element 44 is attached to connector portion 46 of mass holder 18. By arranging sensor element 44 in this way, gravity gradiometer 10 is simplified because a component, sensor element 44, performs two functions, the mechanical oscillator for the forced mass-spring-dampener system and the sensing. Also, the arrangement shown isolates sensor element 44, since sensor element 44 is attached only at the ends by two components that are dense, i.e., mass unit 16 and a structurally sound support arm 20, 32.

Figure 5:
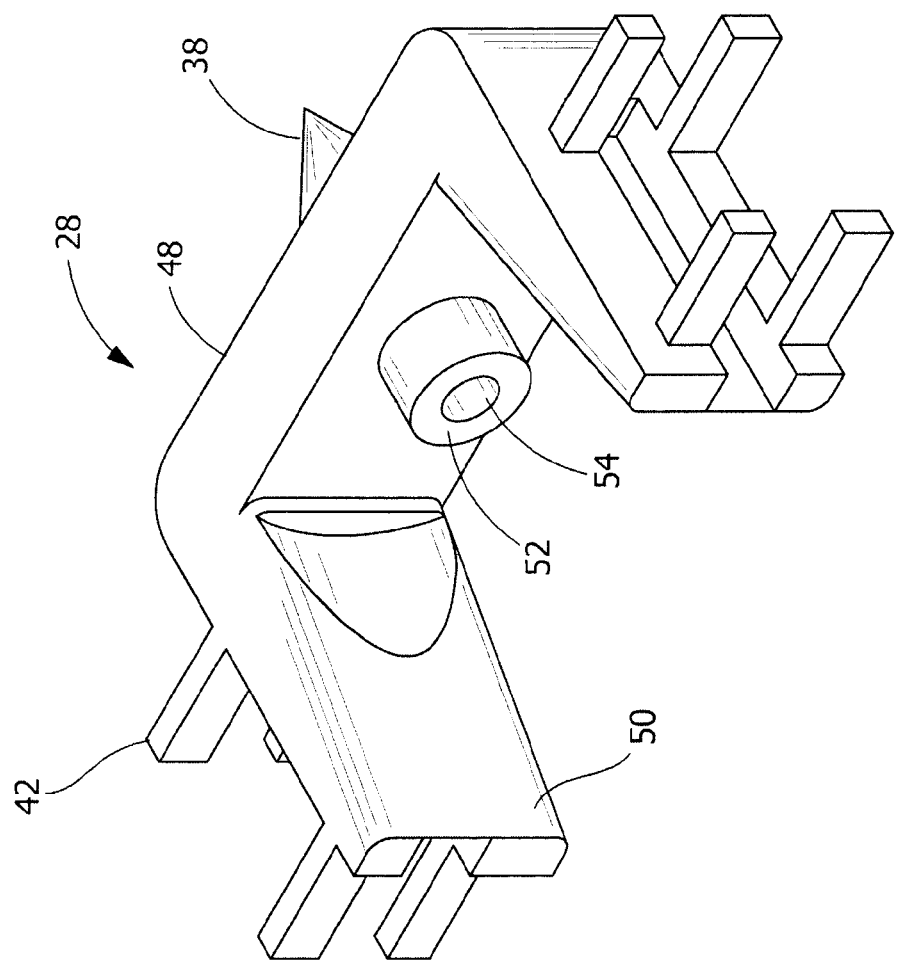
FIG. 5 is a perspective view of a drive member comprising a bottom tier of the gravity gradiometer of FIG. 1.

Referring to FIG. 5, drive member 28 includes centering projection 38, projecting from a cross-member 48. Cross-member 48 connects two opposing bracket arms 50 which also include mounting fingers 42 for attaching sensor elements 44. A connection sleeve 52 having opening 54 for receiving motor shaft 58 is disposed on cross-member 48 opposite centering projection 38. Motor 30 is powered by control circuitry contained on a printed circuit board 56 with external electronic equipment (not shown). Motor shaft 58 may be fixedly attached to sleeve 52 for driving rotation of drive member 28 to impart rotation to gravity gradiometer 10.

The disclosed arrangement of gravity gradiometer 10 provides a tiered system: a top arm or first orthogonal member 12, a middle arm or orthogonal member 14, and drive member 28. Sensor elements 44 extend from end mass units 16 of a respective support arm 20, 32, and attach to the tier beneath support arm to form a single degree of freedom, mass-spring-dampener between each tier.

Fingers 42 projecting from bracket 40 and bracket arms 50 attach to the heads of sensor elements 44, i.e., the piezo laminate of piezo vibration sensors. From this position wires are routed to above orthogonal member 12 where a flat planar surface on hub portion 22 provides a mounting surface to support printed circuit board 56 containing external electronic equipment or circuits for signal processing, data collection and analysis.

In an alternate embodiment the sensor element 44 connection from orthogonal member 14 in the middle tier to drive member 28 may be omitted, by having the motor to apply frictional torque to orthogonal member 14 to drive orthogonal member 14 to the desired rotational velocity. Thus, gravity gradiometer 10 maintains rotational velocity by inertia and angular momentum, to provide free movement rather than quasi-free movement with the piezo sensor element 44. Thus drive member 28 rotates orthogonal member 14 and thus the entire gradiometer 10. The connection of piezo sensor element 44 from orthogonal member 14 to drive member 28 is needed for the vibration and not the sensing. This set of piezo sensor elements 44 provides the bottom arm, i.e., orthogonal member 14 the ability to rotate to external gravitational responses, and still be driven by the driving member. Because driving member 28 rotates orthogonal member 14 by friction, orthogonal member 14 will still be able to swing from the external response, but will rotate to the desired frequency from driving member 28.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

What is claimed is:

1. A rotational gravity gradiometer comprising:
   a first member, a second member, a drive member and a motor;
   the first member disposed above the second member orthogonal to and centered with respect to the second member;
   the first member comprising a first pair of support arms extending axially from a center of the first member;
   the second member comprising a second pair of support arms extending axially from a center point of the second member;
   a mass unit is attached to opposite ends of each support arm at a distal end of the respective first member and second member;
   a first sensor element attached between each mass unit of the first member and a connection point of the second member for sensing movement of the mass unit; and a second sensor element attached between each mass unit of the second member and the drive member; and the drive member coupled to the motor to drive the first member and the second member rotationally;

wherein the respective first and second sensor elements generate a signal in response to deflection of the support arms induced by an external mass.

2. The rotational gravity gradiometer of claim 1, wherein the first member support arms are attached to a hub portion at the center of the first member; the hub portion comprising a recess configured to receive a projection extending from the second member.

3. The rotational gravity gradiometer of claim 1, wherein the second member is orthogonal to the first member.

4. The rotational gravity gradiometer of claim 1, wherein the second member is arranged above the drive member.

5. The rotational gravity gradiometer of claim 1, wherein the support arms of the first member are attached to a center connection, the center connection comprising a first recess for receiving a centering projection of the second member; the first recess being axially aligned with the second member centering projection and a centering projection disposed on the drive member.

6. The rotational gravity gradiometer of claim 1, wherein the second member further comprises a pair of opposing bracket portions affixed to a second member connection portion; each of the bracket portions comprising a plurality of mounting fingers for attachment of one sensor element.

7. The rotational gravity gradiometer of claim 1, wherein the first and second sensor elements comprise a piezo vibration sensor.

8. The rotational gravity gradiometer of claim 7, wherein the piezo vibration sensor comprises a cantilever-type vibration sensor.

9. The rotational gravity gradiometer of claim 1, wherein each mass unit is supported in a mass holder, the mass holder further comprising at least one connector portion for receiving one sensing element, the sensor element configured to detect vibrations propagating along the connector portion in response to gravitational fields.

10. The rotational gravity gradiometer of claim 9, wherein the sensing element further senses temperature changes of the connector portion attached to the sensing element.

11. The rotational gravity gradiometer of claim 1, wherein each sensor element detects vibration caused by deflection of the attached support arm, each sensor element configured to generate an AC voltage signal in response to the horizontal movement of the respective sensor element.

12. The rotational gravity gradiometer of claim 1, wherein the sensor elements are in electrical communication with control circuitry contained on a printed circuit board.

13. The rotational gravity gradiometer of claim 1, wherein each sensor element is isolated by attachment at the ends by one of the mass units and one of the support arms.

14. The rotational gravity gradiometer of claim 1, wherein the drive member comprises a cross member and a centering projection projecting from the cross-member; the cross-member connecting a pair of opposing bracket arms for receiving one of the sensor elements.

15. The rotational gravity gradiometer of claim 14, wherein each of the bracket arms further comprises a plurality of mounting fingers for connection to the sensing element.

16. The rotational gravity gradiometer of claim 1, wherein the drive element further comprises a connection sleeve having an opening for receiving a shaft of the motor, the connection sleeve disposed on a cross-member opposite centering projection.

17. The rotational gravity gradiometer of claim 1, wherein the motor is powered by control circuitry contained on a printed circuit board, the shaft of the motor having a fixed connection to the connection sleeve for driving rotation of drive member to impart rotation to the gravity gradiometer.

18. The rotational gravity gradiometer of claim 1, wherein the motor applies frictional torque to the drive member to drive the second member to a desired rotational velocity, wherein the gravity gradiometer maintains rotational velocity by inertia and angular momentum to provide free movement.

19. A rotational gravity gradiometer comprising a first orthogonal member, a second orthogonal member, and a drive member; sensor elements for sensing vibration extending from an end mass unit at an end of each orthogonal member; the sensor elements attached to the second member and drive member beneath the first and second orthogonal members, respectively, to provide a mass spring dampener having a single degree of freedom between the first and second orthogonal members;

wherein the sensor elements generate a signal in response to a deflection of the orthogonal member induced by an external mass.

* * * * *